April 13, 1926.
1,580,482
J. GOULET
PROCESS AND DEVICE FOR THE PRODUCTION OF PRODUCER GAS
USED FOR PROPELLING VEHICLES
Filed August 21, 1922   3 Sheets-Sheet 2
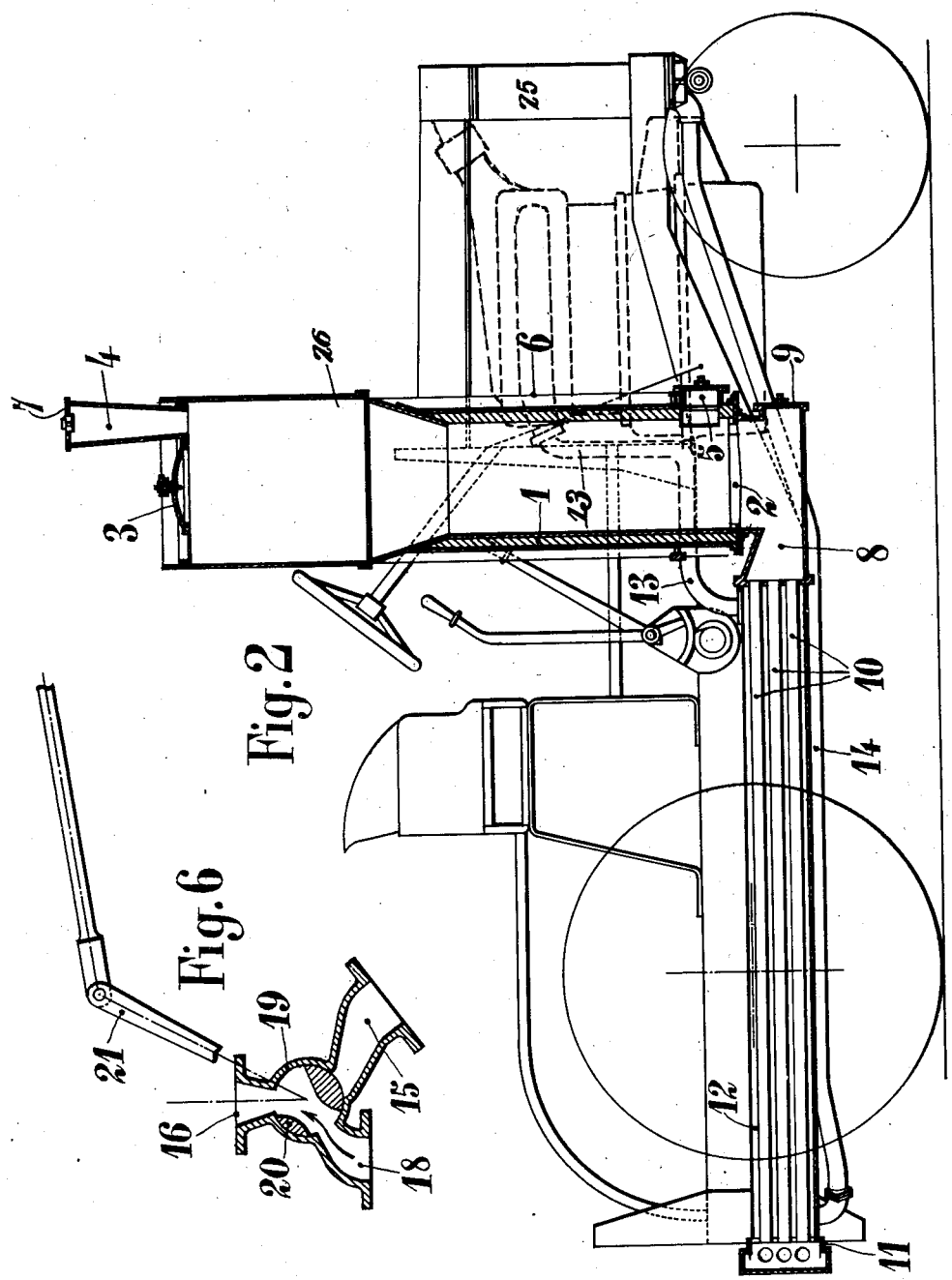
Inventor
J. Goulet
By Marks & Clerk
Attys.

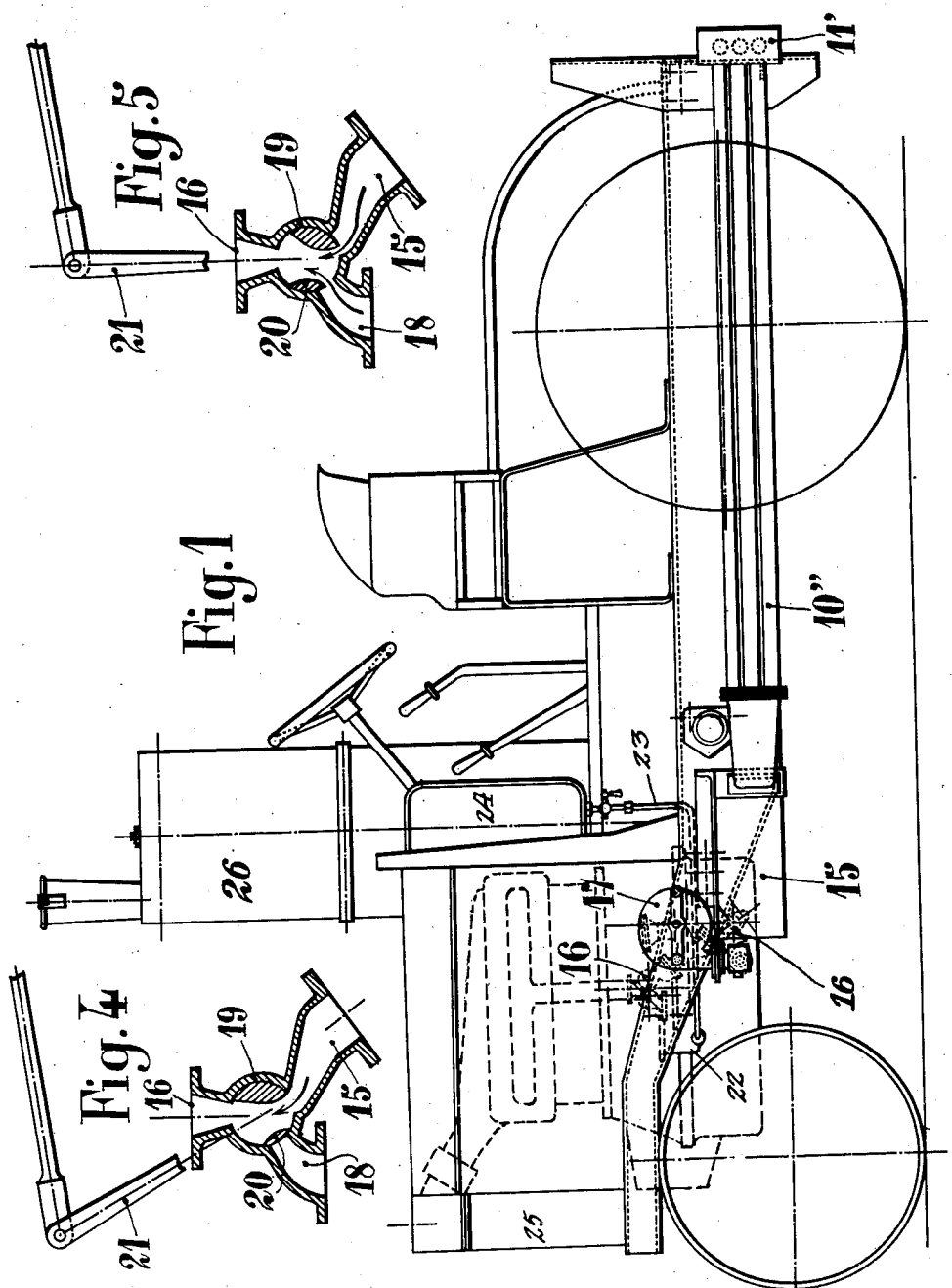

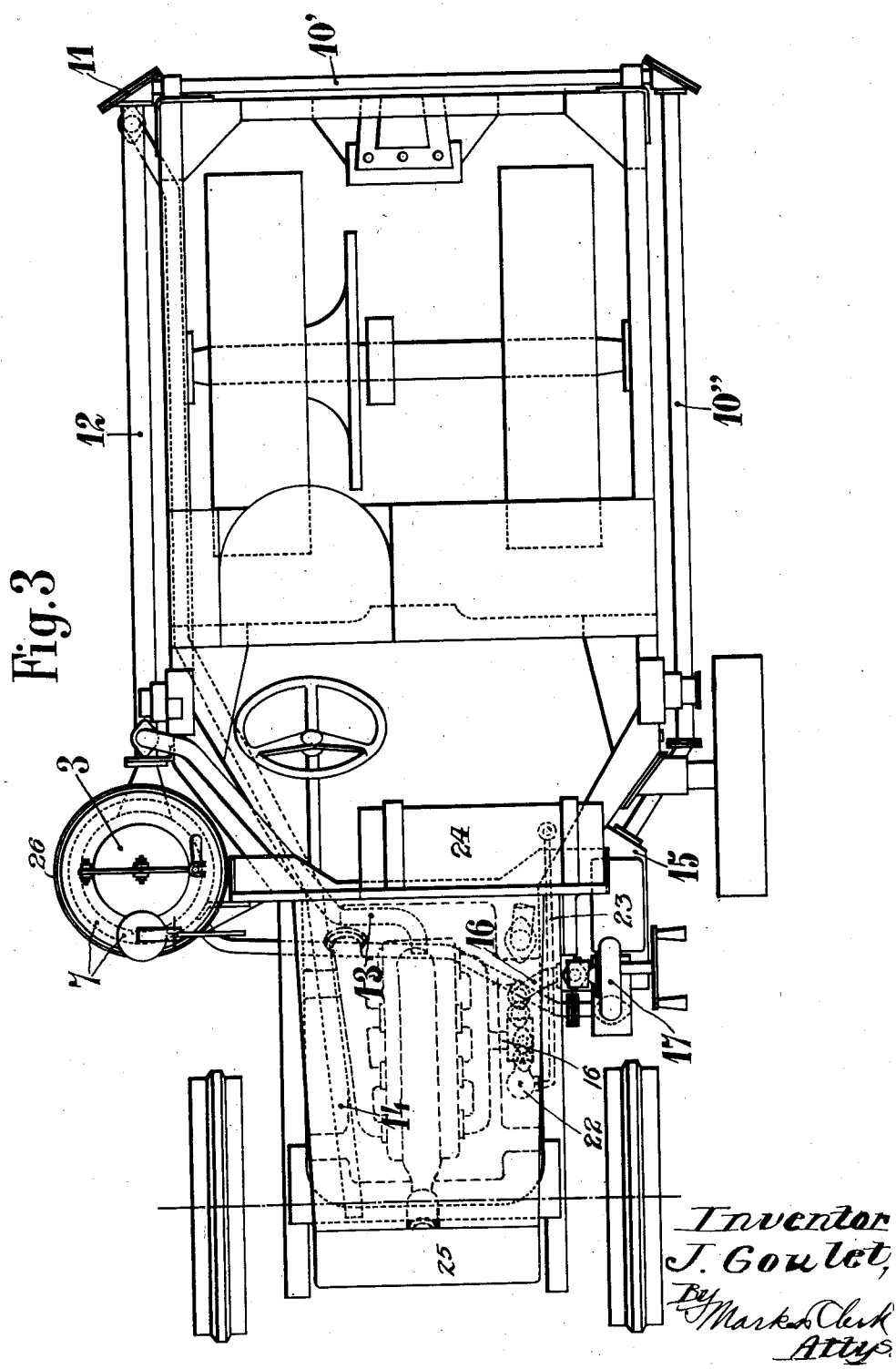

Patented Apr. 13, 1926.

1,580,482

UNITED STATES PATENT OFFICE.

JEAN GOULET, OF VIERZON, FRANCE, ASSIGNOR TO SOCIETE ANONYME: SOCIETE FRANCAISE DE MATERIAL AGRICOLE & INDUSTRIEL, OF VIERZON, FRANCE.

PROCESS AND DEVICE FOR THE PRODUCTION OF PRODUCER GAS USED FOR PROPELLING VEHICLES.

Application filed August 21, 1922. Serial No. 583,424.

*To all whom it may concern:*

Be it known that I, JEAN GOULET, a citizen of the French Republic, residing 20 Rue Alexandre Millerand, Vierzon, France, have invented new and useful Improvements in a Process and Device for the Production of Producer Gas Used for Propelling Vehicles, of which the following is the specification.

It has already been proposed to use producer gas for propelling vehicles. The gas producers used for the production of the gas distilled coal, and consequently necessitated an injection of vaporized water in the vat. Now, the speed of the vehicles being essentially variable, it resulted therefrom that (the injection of water remaining sensibly constant), when the vehicle was running at slow speed or was stationary for a few minutes only, the gas producer was subjected to a cooling rendering the restarting difficult, if not doubtful, and in any case extremely long and laborious. Moreover; these gas producers necessitate the use, in the train of the vat, of a scrubber in which the gas produced is cooled by direct and intimate contact with a second and important injection of water, which latter cannot, subsequently, be used owing to the chemical alteration and mechanical fouling to which it is subjected therein.

This invention relates to a process of production of producer gas on board vehicles, adapted to avoid these inconveniences. For that purpose, use is made of the gas produced in the gas producer by means of wood employed with charcoal. The gas produced being directly utilizable, without injection of vaporized water, it results therefrom that the operation of the gas producer is entirely controlled by the working of the engine. The working of the furnace when the engine works at slow speed or is at rest, as well as in certain defective conditions may, moreover, be maintained by using a reverse combustion gas producer having a stack at the upper part as well as several series of air intakes suitably arranged in the middle part of the vat as described in the British Patent No. 14,304, dated 14th June 1910, these means being associated with the suppression of the scrubber and of the second injection of water for the cooling of the gas; the cooling of the gas is simply obtained by the use of a surface cooling device in which the water is not in intimate contact with the gas, then a cooling by the air of the atmosphere through suitable pipings or even, in a more simple manner, by the simple cooling by the air of the atmosphere. These arrangements offer the important advantage for a vehicle of limiting the weight of water to be transported, in the first case and, in the second case, of entirely doing away with it for the working of the gas producer.

The accompanying drawings illustrate, by way of example and diagrammatically a form of carrying out the present invention applied to a tractor provided with a surface water cooling arrangement, then a cooling of the gases issuing from the gas producer by the air of the atmosphere, through pipings.

Fig. 1 is a right-hand elevation of the tractor.

Fig. 2 is a left hand elevation.

Fig. 3 is a plan view corresponding to Figs. 1 and 2.

Figs. 4, 5 and 6 illustrate, in three different positions, a form of construction of a cock interposed on the inlet piping of the engine and allowing the latter to work with producer gas, hydrocarbons, or with a mixture of controllable proportions of these fuels.

The tractor illustrated is provided with an internal combustion engine of ordinary type, normally fed with producer gas and eventually with gasoline or a mixture of air, gasoline and producer gas. The engine is mounted in dotted lines in the drawing. The gas producer 26 is of the type described in the British Patent No. 14,304, dated 14th June 1910; as already stated, this gas producer is of the reverse combustion system (that is to say with circulation of air from the top downward in normal working) and uses a mixture of wood and wood charcoal as a fuel, this excluding any injection of vaporized water.

It is composed of a refractory vat 1 provided with a grid 2 at its lower part for retaining the fuel. The upper part has a charging door 3 and a stack 4. A door 5, at the lower part, allows to light the furnace.

The refractory vat 1 is surrounded by a sheet-iron casing 6 and the space comprised between them serves as a conduit for the air which enters into the vat through median openings, after being reheated by contact with the hot walls of the vat. The stack 4 the opening of which is adjustable by hand allows upon lighting, the issue of the combustion gases, then when running at slow speed, to maintain a sufficient combustion in the vat owing to the hot column comprised between the latter and the median air intakes. In fact, when the engine working at slow speed requires a very small quantity of gas from the gas producer, which tends to progressively extinguish the fire, the hot column formed between the air intakes and the stack enters in action and produce a reverse current from the bottom upward which keeps up the furnace which is no longer fed in sufficient conditions by the engine. It suffices therefore to control by hand the opening of the stack for keeping up at will the rate of working of the furnace for obtaining when restarting the amount of gas which is necessary. If, instead of working at slow speed, the engine is at rest, this hot column from the median nozzles to the stack being no longer urged from below by the suction of the engine, then gives it full action and allows to keep up the furnace at a sufficient rate of working so that restarting may be effected very easily after a rather long time.

For the purpose of controlling the working of the stack 4, the latter carries a control knob 7 which can be actuated by hand.

The ash-pit 8 has on one side a door 9 closing it hermetically and receives, on the wall opposite to this door, tubes 10 for conducting the gas.

The gas producer 26 is arranged, in the example illustrated, on the right-hand side of the tractor, but it is obvious that this arrangement is not essential and can be replaced by any arrangement appropriate to the tractor.

The tubes 10 connect the ash-pit 8 to a junction box 11, by following the right hand frame-beam of the car. These tubes are enclosed in a casing 12 wherein takes place a circulation of water adapted to cool the gases. The casing 12 is connected, on the one hand, through the piping 13 to the water circulating chamber of the engine and, on the other hand, through the piping 14, to the radiator 25 of the engine, so that the water which has been used for cooling the gases issuing from the gas producer 26 is used again, after a suitable cooling, for cooling the walls of the engine. The whole constituted by the casing 12 and the tubes 10 is, consequently, a surface cooling device and not a contact cooling device; the water can then serve indefinitely, with a very small reserve, that is to say with the minimum load transported by the tractor.

The junction box 11 is connected, at the rear of the vehicle, to a second similar box 11' by means of the tubes 10'. The gases are then led from the box 11' to a conduit pipe as gas reservoir 15 through the tubes 10 which follow the left-hand beam of the frame.

The conduit pipe 15 is in its turn connected through the pipe 16' to the suction branch 16 of the engine. This conduit pipe has two unions which serve, one to connect the engine to the conduit pipe 15, the other to connect the negine to a carburettor 22 of a current type which is connected to the hydrocarbon reservoir by the pipe line 23. Each of these branches can be closed when the other is in use, by means of any suitable system.

For starting the gas producer, use is made of a fan 17 controlled by two three-way cocks allowing either to send air to the lower part of the gas producer for lighting purposes or to draw from the gas producer to the engine when the fire is sufficiently lighted and to thus send to this engine a gas suitable for starting. Two fans may of course be used for obtaining the same result, the first one serving for lighting, the second to draw to the engine the utilizable gas.

As already stated, the engine used is an internal combustion engine working eventually with gasoline or with a mixture of producer gas and gasoline vapour and air; the gasoline may, of course, be replaced by any hydrocarbon vaporized in a suitable carburettor.

Since the power of the same motor is reduced to a considerable degree when supplied with poor gas than with hydrocarbons such as gasoline it is useful when applying the system to an automobile or like vehicle to be able to increase this power as desired when operating, for example, at one side.

For that purpose, the piping connecting the engine on the one hand to the gas producer 26 and, on the other hand, to the carburettor 22 fed with hydrocarbons, is devised not only for permitting of alternately working either with producer gas, or with hydrocarbons, but also for feeding the engine with a mixture of producer gas and hydrocarbon the relative proportions of which can be modified so as to obtain the necessary power for ensuring the proper running of the vehicle.

As shown by way of example in Figs. 4, 5 and 6, the conduit pipe 15 feeding the producer gas and the branch 18 on which is mounted the hydrocarbon carburettor, open in a common shell or seat 19 carrying also the branch which corresponds to the inlet header of the engine. In this shell or seat 19 is arranged the plug 20 of a three-way cock which can be operated, by means of a suitable control gear 21 by the driver of the vehicle.

When the plug occupies the position shown in Fig. 1, the engine receives only producer gas through the conduit pipe 15. On the contrary, in the position shown in Fig. 3, it receives only the explosive mixture produced by the atomization of the hydrocarbons in the body of the carburettor 22.

In any intermediate position between these limit positions, the engine simultaneously receives producer gas and a hydrocarburetted mixture; the relative proportions of these combustible gases depend on the section of opening of the corresponding pipings and, consequently, on the position of the plug 20.

It is also possible not only to cause the engine to produce its maximum by working solely with hydrocarbons but also to add a supplement of power to that produced by the working with producer gas, by simultaneously introducing in the cylinders of the engine a variable quantity of hydrocarbons.

What I claim as my invention and desire to secure by Letters Patent is:

1. In a motor vehicle, in combination, an internal combustion engine, a fuel mixture reducing tank, an inverted combustion generator in the tank, an ash pit at the bottom of the generator, a hopper at the top of the generator, a chimney extending from the top of the hopper and directly communicating with the generator, means for regulating the cross-sectional opening of the chimney, a rear junction box, a series of tubes communicating respectively with the generator ash pit and the rear junction box, a casing surrounding said tubes, means for creating a water circulation about the series of tubes in said casing, other tubes establishing communication between the casing and the vehicle radiator and the water jacket of the engine cylinders, another series of tubes extending from the rear junction box, these tubes being in contact with the atmosphere and a sleeve connecting said last mentioned series of tubes with the intake manifold of the engine.

2. In a motor vehicle, in combination, an internal combustion engine, a fuel mixture reducing tank, an inverted combustion generator in the tank, an ash pit at the bottom of the generator, a hopper at the top of the generator, a chimney extending from the top of the hopper and directly communicating with the generator, means for regulating the cross-sectional opening of the chimney, a rear junction box, a series of tubes communicating respectively with the generator ash pit and the rear junction box, a casing surrounding said tubes, means for creating a water circulation about the series of tubes in said casing, other tubes establishing communication between the casing and the vehicle radiator and the water jacket of the engine cylinders, another series of tubes extending from the rear junction box, these tubes being in contact with the atmosphere, a sleeve connecting said last mentioned series of tubes with the intake manifold of the engine, means for supplying the engine with either poor gas or hydrocarbons including a pipe for conducting the poor gas, a carbureter for supplying hydrocarbons, a valve housing including a pipe mounted on the intake manifold of the motor and two other pipes connected respectively to the pipes supplying the poor gas and to the carbureter, and a movable key in said housing to permit of supplying the engine with either poor gas or hydrocarbons or with a mixture of these two.

In testimony whereof I have signed my name to this specification.

JEAN GOULET.